US009376219B2

(12) United States Patent
Sibona et al.

(10) Patent No.: US 9,376,219 B2
(45) Date of Patent: Jun. 28, 2016

(54) ACTUATING SYSTEM OF SECTORS OF A DEVICE FOR PRODUCING AN AIRPLANE FUSELAGE

(71) Applicant: Alenia Aermacchi S.p.A., Venegono Superiore (IT)

(72) Inventors: Guido Sibona, Rosta (IT); Ettore Mostarda, Corsano (IT); Giuseppe Iovine, Naples (IT)

(73) Assignee: ALENIA AERMACCHI S.P.A., Venegono Superiore (IT)

( * ) Notice: Subject to any disclaimer, the term of this patent is extended or adjusted under 35 U.S.C. 154(b) by 455 days.

(21) Appl. No.: 13/852,021

(22) Filed: Mar. 28, 2013

(65) Prior Publication Data

US 2013/0298365 A1   Nov. 14, 2013

(30) Foreign Application Priority Data

Mar. 30, 2012   (IT) .............................. TO2012A0284

(51) Int. Cl.
| | |
|---|---|
| *B64F 5/00* | (2006.01) |
| *B29C 33/48* | (2006.01) |
| *B29C 53/82* | (2006.01) |
| *F16H 25/20* | (2006.01) |
| *F16H 25/24* | (2006.01) |

(52) U.S. Cl.
CPC ............. *B64F 5/0009* (2013.01); *B29C 33/485* (2013.01); *B29C 53/824* (2013.01); *F16H 25/2021* (2013.01); *F16H 2025/249* (2013.01); *Y02T 50/433* (2013.01); *Y10T 29/53961* (2015.01)

(58) Field of Classification Search
None
See application file for complete search history.

(56) References Cited

U.S. PATENT DOCUMENTS

| | | | | |
|---|---|---|---|---|
| 3,183,732 A | * | 5/1965 | Porath ................. | B23Q 11/125 384/100 |
| 4,802,558 A | | 2/1989 | Garnett | |
| 6,692,681 B1 | * | 2/2004 | Lunde .................... | B29C 43/12 156/173 |

(Continued)

FOREIGN PATENT DOCUMENTS

| | | |
|---|---|---|
| DE | 19525023 | 1/1997 |
| JP | 2002 361541 | 12/2002 |
| WO | 2007148301 | 12/2007 |

OTHER PUBLICATIONS

DE 19525 023 English Translatioin attached as pdf.*

*Primary Examiner* — Joseph J Hail
*Assistant Examiner* — Brian Keller
(74) *Attorney, Agent, or Firm* — Gottlieb, Rackman & Reisman, PC

(57) ABSTRACT

An actuating system of sectors of a device for producing an airplane fuselage in which a lamination mandrel includes a plurality of sectors that are angularly spaced about an axis and mobile between an expanded lamination position and a contracted dissembled position. Each sector has screw-nut screw type actuating system in which a threaded element is rotated about the axis by a motor. The threaded element includes an internal shaft made of a first material extending along the axis, an external tubular portion made of a second material that is mounted axially on the shaft and constraint element arranged between the internal shaft and the external tubular portion to prevent angular displacement of the external tubular portion with respect to the internal shaft and allow a linear sliding of the external tubular portion with respect to the internal shaft.

5 Claims, 5 Drawing Sheets

(56) References Cited

U.S. PATENT DOCUMENTS

| | | | |
|---|---|---|---|
| 7,287,940 B2* | 10/2007 | Feldmeier et al. | 409/233 |
| 2005/0039843 A1 | 2/2005 | Johnson et al. | |
| 2006/0042437 A1* | 3/2006 | Gerrard | B23Q 11/0003 83/39 |
| 2010/0154990 A1* | 6/2010 | Brennan et al. | 156/285 |
| 2010/0155984 A1 | 6/2010 | Hollensteiner | |

* cited by examiner

ACTUATING SYSTEM OF SECTORS OF A DEVICE FOR PRODUCING AN AIRPLANE FUSELAGE

CROSS-REFERENCE TO RELATED APPLICATION

This patent application claims benefit under 35 U.S.C. §119 to IT TO2012A 000284, filed Mar. 30, 2012, which is hereby incorporated by reference as part of the present disclosure.

FIELD OF THE INVENTION

The present invention concerns an actuating system of sectors of a device for producing an airplane fuselage.

BACKGROUND OF THE INVENTION

WO 2007/148301 describes a device for producing an airplane fuselage in which a lamination mandrel is delimited by an external surface that is defined by a rotational solid (in particular a cylinder) that is symmetrical and rotatable about an axis. The lamination mandrel is adapted to receive and support a band of impregnated synthetic material which is wound and deposited on the external surface of the mandrel in a lamination phase forming a plurality of overlapped layers. Said overlapped layers are subjected to a subsequent high temperature polymerisation process under vacuum in an autoclave for forming a structural section of the airplane (typically a tubular portion of fuselage).

The lamination mandrel comprises a plurality of sectors angularly spaced about the axis and held by guides which extend radially from a supporting grid structure. The sectors are mobile between an expanded, lamination position in which the sectors have greater rectilinear edges parallel to the axis arranged side by side and the external surfaces of the sectors opposite the axis that define the external surface and a contracted, disassembling position in which the sectors approach the axis moving away from the trace of the surface to allow extraction of the lamination mandrel from the structural section of the airplane at the end of the polymerisation process under vacuum.

In the expanded lamination position, it is essential for the sectors to maintain an angularly and axially stable position with respect to one another since any slight movements between the parts can irreparably alter the geometry of the structural section. For example, a lamination mandrel used for producing structural sections of large passenger airplanes must have low dimensional tolerances, below, for example, 0.5 mm.

The movement of each sector from the expanded, lamination position to the contracted, disassembling position is normally performed by means of a screw-nut screw actuating system driven by an electric motor positioned on the supporting grid structure.

Said screws are normally made of steel which, as is known, is a metal that expands considerably at high temperatures. At the temperatures normally reached in an autoclave (around 200-300 C.°), the screws normally used elongate by a few mm (e.g., approximately 10 mm), moving the sectors from the expanded, lamination position reached when cold to an expanded, position in which the external surface has a greater diameter than that of the external surface when cold again.

Said phenomenon results in the structural section of the airplane having dimensions not corresponding to the design dimensions. Therefore, the structural section cannot be used (for example because the structural section is not able to couple with other sections).

Thus, there is a need to produce a sector actuation system that solves the above-mentioned technical problem and is not sensitive to the thermal cycles performed in an autoclave.

The documents DE 195 25 023, JP 2002 361541, U.S. Pat. No. 4,802,558 and US 2010/155984 represent known prior art.

SUMMARY OF THE INVENTION

The preceding object is achieved by the present invention which relates to an actuating system of sectors of a device for producing an airplane fuselage in which a lamination mandrel is delimited by an external surface that is defined by a rotational solid that is symmetrical and rotatable about an axis. The lamination mandrel is adapted to receive and support a band of impregnated synthetic material which is deposited and wound on the external surface forming a plurality of overlapping layers which are subjected to a high temperature polymerisation process under vacuum for forming a structural section of the airplane. The lamination mandrel comprises a plurality of sectors angularly spaced about the axis and mobile along guides between an expanded, lamination position in which the sectors have greater rectilinear edges that are parallel to the axis arranged side by side and the external surfaces of the sectors opposite the axis define together said external surface and a contracted, disassembling position in which at least part of said sectors approaches the axis moving away from the trace of the surface to reduce the radial dimensions of the mandrel and allow extraction of said mandrel from the structural section of the airplane. Each sector includes a screw-nut screw type actuating system comprising a threaded rectilinear element extending along a radially extending rotational axis, a nut screw and motor means, wherein the threaded rectilinear element comprises an internal shaft made of a first material and extending along said axis and an external tubular portion made of a second material, axially mounted on a portion of said internal shaft that is provided externally with said threading. The first material has a dilatation coefficient smaller than the dilatation coefficient of the second material. Constraint means are provided between said internal shaft and said external tubular portion that are adapted to prevent angular displacement of the external tubular portion with respect to the internal shaft allowing a linear sliding of the external tubular portion with respect to the internal shaft. A first end portion of the external tubular portion is connected to a respective end portion of said internal shaft. A thermal stress is applied to said threaded element producing a sliding of a second free end portion of the external tubular portion with respect to the internal shaft so that said stress does not produce an overall elongation of the threaded rectilinear element and each sector remains in the previously defined expanded lamination position also following said thermal stress.

BRIEF DESCRIPTION OF THE DRAWINGS

The invention will now be illustrated with reference to the accompanying figures which show a preferred embodiment example in which.

DETAILED DESCRIPTION OF THE INVENTION

Figure 1:
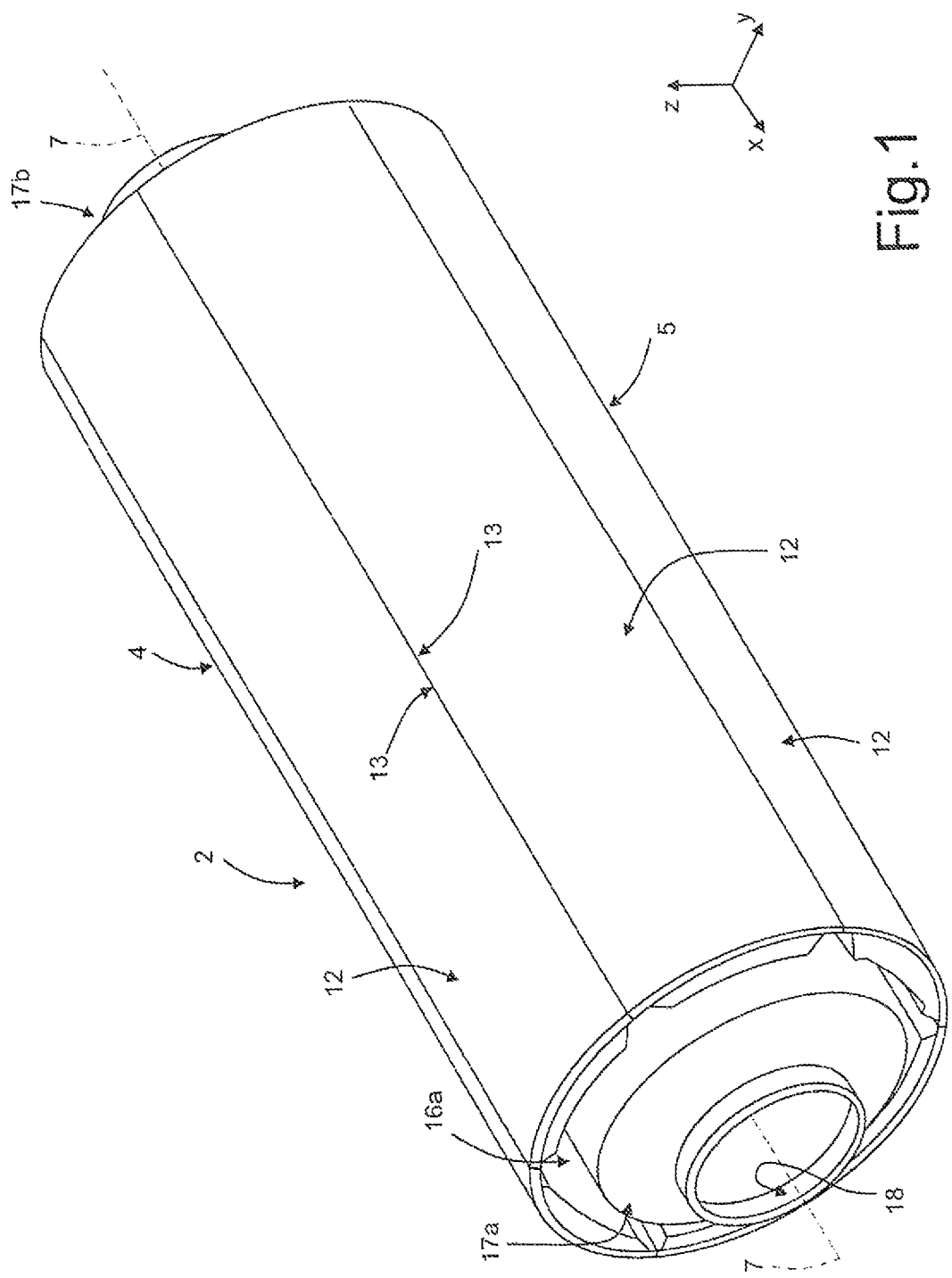
FIG. 1 is a perspective view of an embodiment of a device for producing an airplane fuselage which uses an actuating system according to the present invention.
Figure 3:
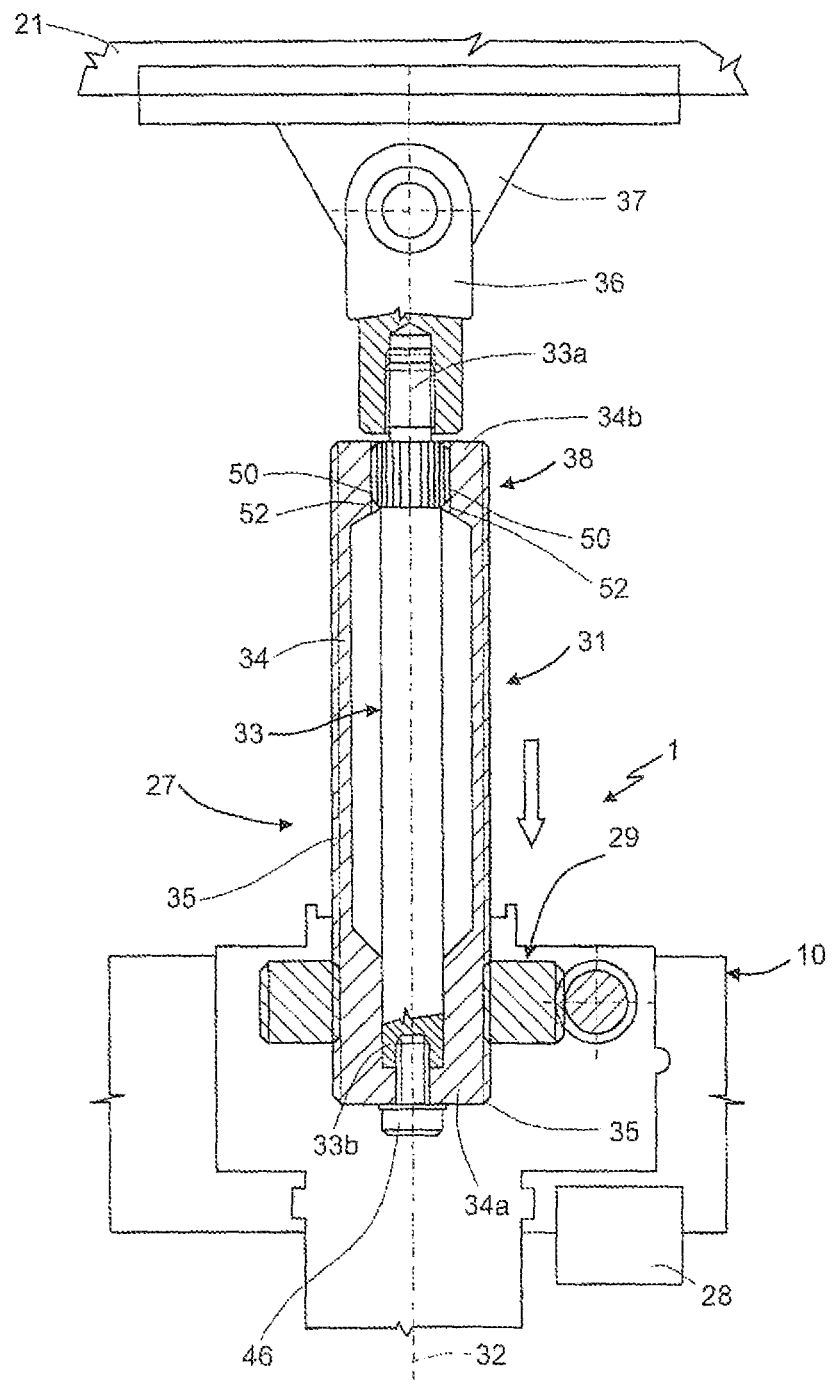
FIG. 3 is a cross-sectional side view (on an enlarged scale) of the device of FIG. 1 that illustrates the actuating system produced according to the present invention.
Figure 4:
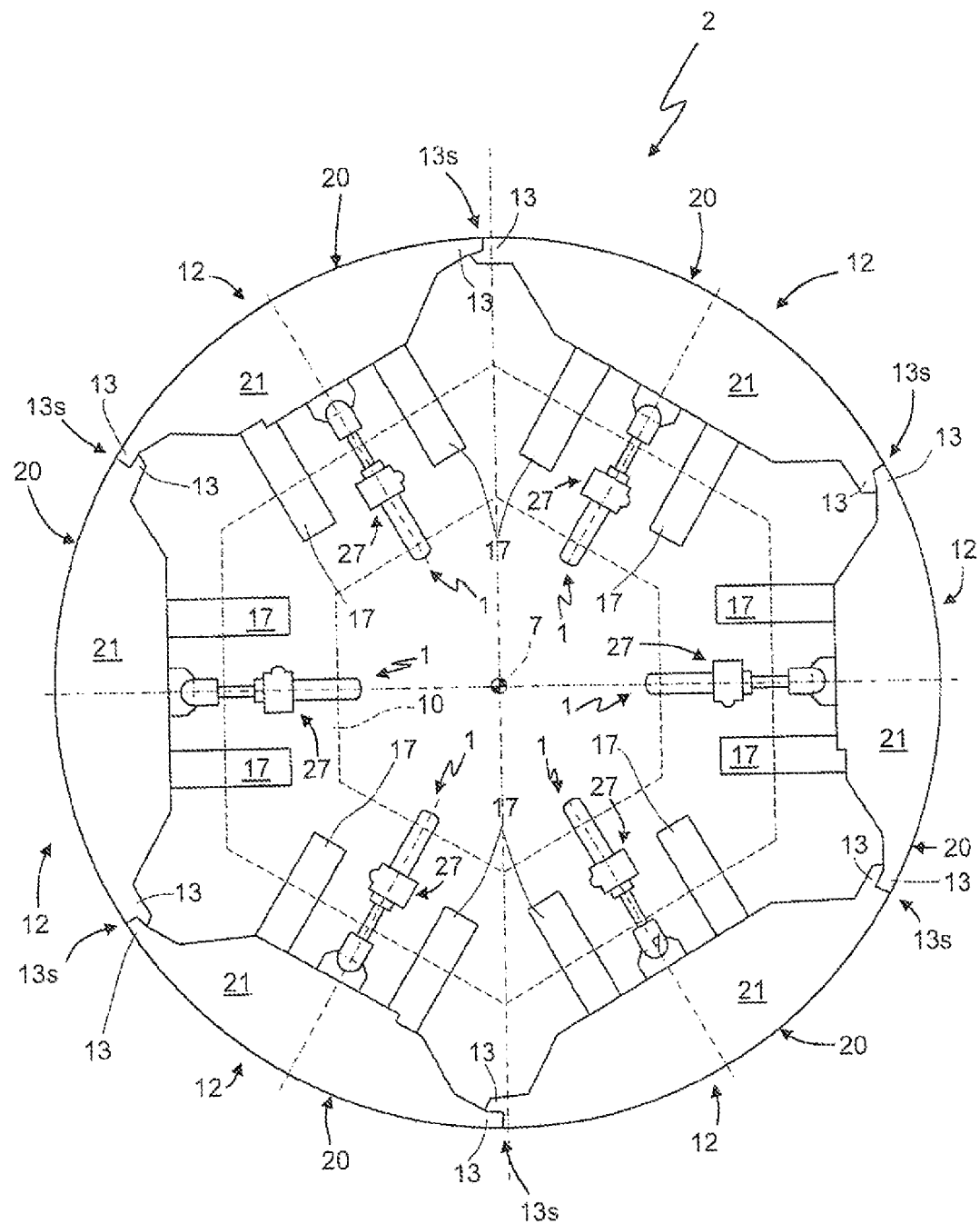
FIG. 4 is a cross-sectional end view of a portion of the actuating system in a first, closed operating position.
Figure 5:
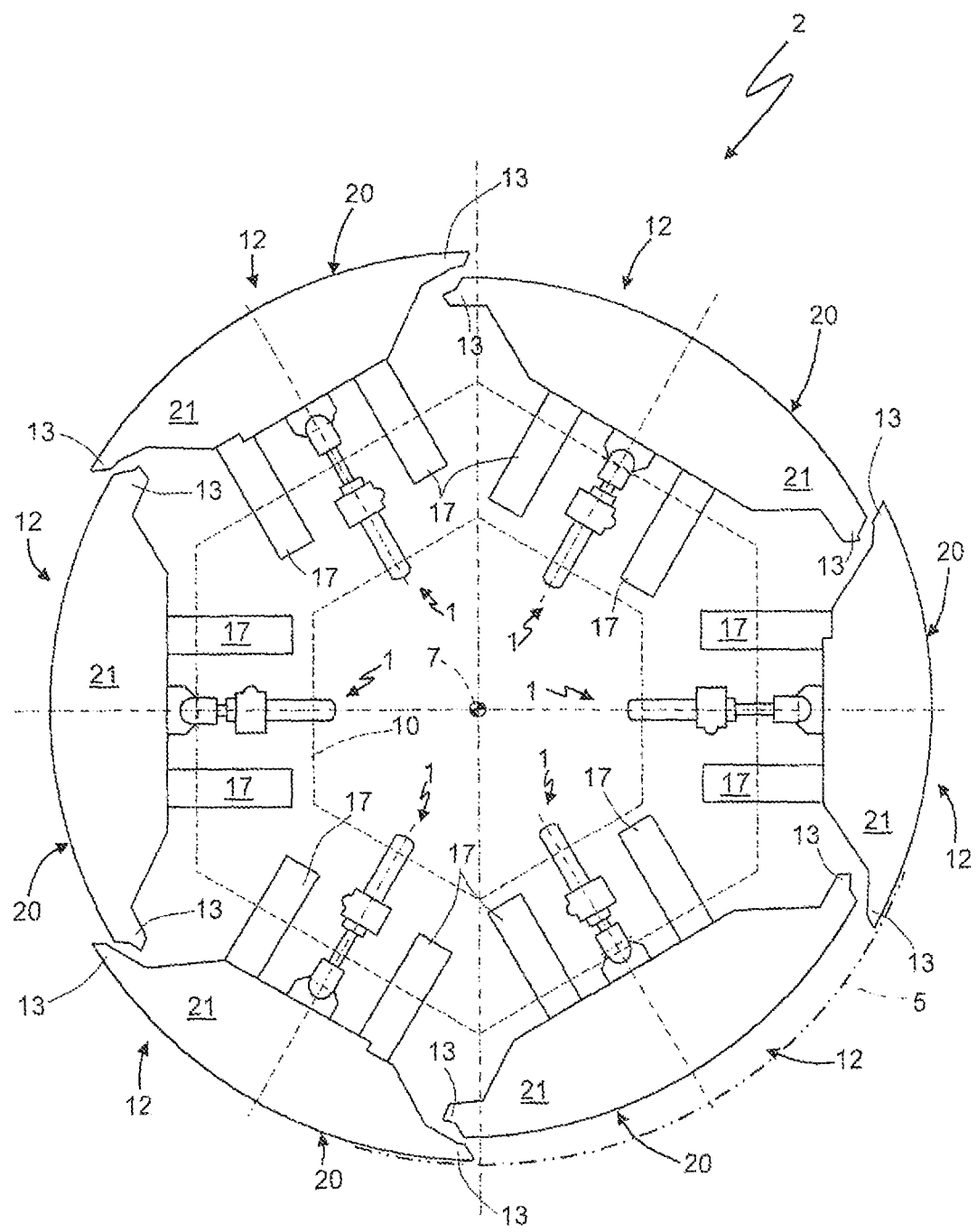
FIG. 5 is a cross-sectional end view of a portion of the actuating system in a second, open operating position.

In FIGS. 3, 4 and 5, an actuating system of sectors of a device 2 (FIG. 1) for producing an airplane fuselage is indicated overall by reference numeral 1.

In particular, the device 2 (FIG. 1) comprises a lamination mandrel 4 delimited by an external surface 5, which defines a rotational solid structure that is symmetrical and rotatable about an axis 7. The lamination mandrel 4 is adapted to receive and support a band of impregnated synthetic material which is deposited and wound on the external surface 5 forming a plurality of overlapping layers which completely and uniformly cover the surface 5. The band of synthetic material (e.g., carbon fiber) is deposited by a lamination head (of known type—not illustrated) on the lamination mandrel 4.

For example, the band can be deposited by causing the mandrel 4 to rotate about the axis 7 and causing the lamination head (not illustrated) to translate in a coordinated manner along said axis 7. A lamination head is illustrated, for example, in U.S. Patent Application No. 2005/0039843. At the end of lamination of the band, the band of impregnated composite material is subjected to a polymerisation process under a vacuum to produce a tubular structural section of the airplane. Said process is carried out by placing the lamination mandrel 4 in an autoclave (not illustrated) and performing a thermal heating cycle of known type.

In the example shown, the external surface 5 is cylindrical and the lamination mandrel 4 is used to produce a cylindrical tubular portion of the airplane fuselage.

Figure 2:
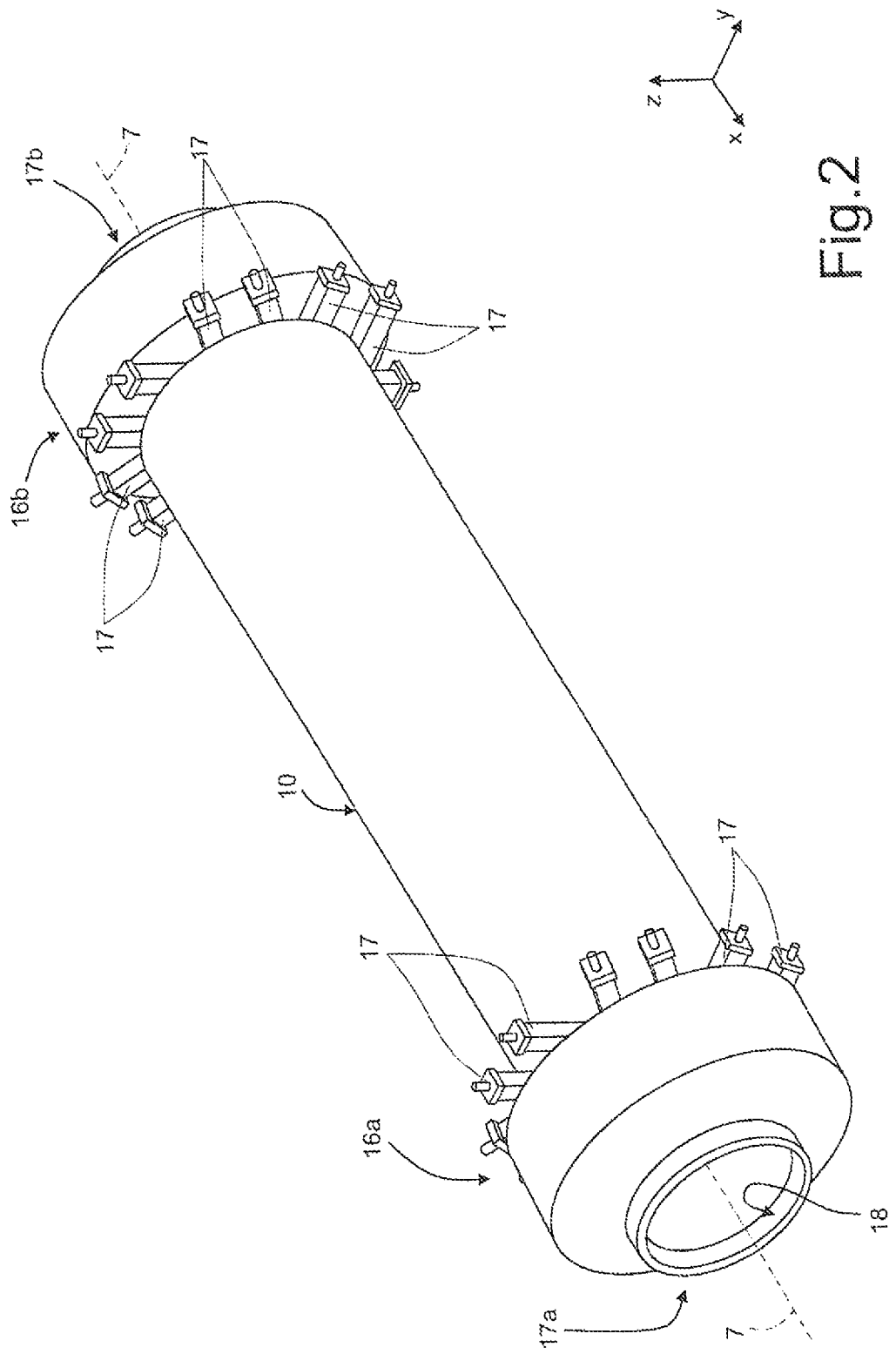
FIG. 2 is a perspective view of the internal structure of the device of FIG. 1.

The lamination mandrel 4 comprises a plurality of sectors 12 (FIGS. 4 and 5 illustrate, for example, six sectors 12) angularly spaced about the axis 7 and held by a supporting structure 10 (See FIG. 2) which extends in a linear manner along the axis 7.

The sectors 12 are mobile between an expanded lamination position (See FIGS. 1 and 5) in which the sectors 12 have greater rectilinear edges 13 parallel to the axis 7 arranged side by side and the external surfaces of the sectors 12 opposite the axis 7 are adjacent to one another and define, as a whole, the cylindrical surface 5 and a contracted, disassembling position (See FIG. 5) in which the sectors 12 approach the axis 7 moving away from the trace of the surface 5, reducing the radial dimensions of the mandrel 4 to allow extraction of the mandrel 4 from the structural section of the airplane at the end of the process.

The supporting structure 10 extends between a first and a second annular end portion 16a, 16b (See FIG. 2), each of which has a respective frustoconical-shaped end portion 17a, 17b which extends axially.

The frustoconical end portions 17a, 17b are made of a metallic material and each delimit a central opening 18 coaxial with the axis 7.

WO 2007/148301 provides an example of an embodiment and use of a structure of the above-mentioned type and of the end portions 17a, 17b.

Each sector 12 comprises a curved metallic wall 20 (FIGS. 3,4 and 5) which in cross-section has the profile of an arc of a circle with an aperture of 60° with respect to the axis 7 and a stiffening structure 21 formed of a plurality of ribs 50 spaced axially from one another and facing towards the inside of the mandrel 4 to prevent deflections/deformations of the wall 20, ensuring that the surface 5 remains perfectly cylindrical and coaxial with the axis 7.

The adjacent edges 13 of two contiguous sectors 12 are adapted to position themselves one above the other in a perimeter overlap region 13 (FIG. 4).

Between the stiffening structure 21 of each sector 12 and the supporting structure 10, a pair of rectilinear guides 17 (of known type) is provided, adapted to support each sector 12 and allow a linear movement, in a radial direction with respect to the axis 7 and in opposite directions, of each curved wall 20 between the expanded and contracted lamination positions.

The movement of each sector 12 is achieved by an actuating system 27 (FIG. 3) that is positioned between a pair of guides 17 and provided with an electric motor 28 (FIG. 3, shown schematically) configured to achieve the above-mentioned translation movement.

According to the present invention, the actuating system 27 is a screw-nut screw type actuating system and comprises a nut screw 29 held by the supporting structure 10 and rotated by the motor 28 (for the sake of simplicity, the transmission is not illustrated in FIG. 3) and a rectilinear threaded element 31 coupled with the nut screw 29 and having one end connected to the stiffening structure 21 of a sector 12. The rectilinear threaded element 31 extends in a radial direction along an axis 32 which lies on a plane perpendicular to the axis 7.

Alternatively, the nut screw 29 could be arranged on the stiffening surface 21 of a sector 12 and the threaded element 31 could be held by the supporting structure 10 and rotated by the motor 28.

The threaded element 31 comprises an internal shaft 33 (FIG. 3) made of a first metallic material and extending along the rotational axis 32 and an external cylindrical tubular portion 34 made of a second metallic material, mounted axially on a portion of the shaft 33 and provided externally with a thread 35 which engages with the nut screw 29 which is held by the supporting structure 10 and rotated by the electric motor 28 (as highlighted above, for the sake of simplicity the transmission positioned between the output shaft of the motor 28 and the nut screw 29 is not shown). The length of the external tubular portion 34 is approximately equal to the length of the internal shaft 33 which is thus covered almost throughout its length and contained within a cylindrical cavity defined by the tubular portion 34.

The first metallic material (e.g., Invar 36) has a dilatation coefficient smaller than the dilatation coefficient of the second metallic material (e.g., steel).

For example, the steel can have the following thermal dilatation coefficient (expressed in mm/C.°):

| Alloy steel | 18NiCrMo5 | 0.0124 |
| Alloy steel | 34CrNiMo6 | 0.0124 |
| Alloy steel | 42 CrMo 4 | 0.0124 |
| Cylinder steel | St35 - St37 | 0.0124 |
| Cylinder steel | ST 52 | 0.0124 |
| Cylinder steel | ST E 460 | 0.0124 |
| Stainless steel | AISI 304 X5CrNi 18-10 | 0.0165 |
| Stainless steel | AISI 316 X5CrNiMo 17-12-2 | 0.0165 |
| Stainless steel | AISI 410 X12 Cr 13 | 0.011 |
| Stainless steel | AISI 420 X30 Cr 13 | 0.011 |
| Stainless steel | AISI 430 X6 Cr 17 | 0.01 |

-continued

| Stainless steel | AISI 630 X5CrNiCuNb 16-4 | 0.011 |
|---|---|---|
| Stainless steel | AISI 904 X1NiCrMoCu25-20-5 | 0.0161 |
| Hardened stainless steel | X105 Cr Mo 17 | |

As is known, Invar is a metal alloy consisting mainly of iron (64%) and nickel (36%), with traces of carbon and chromium, discovered by the Swiss Nobel prize-winner physicist Charles Edouard Guillaume. Its thermal dilatation coefficient (approximately 10-6 K-1 in length) is approximately one tenth compared to that of steel.

The second metallic material has a dilatation coefficient that is greater than the dilatation coefficient of the first material, but has better mechanical strength characteristics than those of the first material.

The shaft 33 has a first end portion 33a from which a rectangular plate 36 extends that in turn is hinged to a bracket 37 which extends radially from the stiffening structure 21 towards the axis 7.

The first end portion 33a is not covered by the cylindrical tubular portion 34 and has a smaller diameter than the portion of the shaft 33 covered by the cylindrical portion 34.

A second end portion 33b of the shaft 33 has an axial hole housing a terminal portion of a screw 46 used to fix in a stable manner a first end portion 34a of the tubular portion 34 to the shaft 33.

Between the internal shaft 33 and the tubular portion 34, angular constraint means 38 are provided. The angular constraint means 38 are adapted to prevent angular displacement of the tubular portion 34 with respect to the internal shaft 33 and therefore allow transfer of the torque generated by the electric motor 28 to the shaft 33, but allow for linear sliding of the tubular portion 34 with respect to the internal shaft 33 following thermal stress applied to the threaded element 31 as a whole.

For example, the constraint means 38 can be made of a plurality of longitudinal ribs 50 (e.g., triangular section FIG. 3) provided on the external surface of a terminal portion of the internal shaft 33 and adapted to couple with relative longitudinal grooves 52 provided on the internal surface of a terminal portion of the tubular portion 34.

In this way a temperature increase applied to the threaded element 1 (the temperature increase is caused by a thermal cycle performed in an autoclave) produces a deformation of the tubular portion 34 which elongates, moving the second end portion 34b of the tubular portion towards the plate 35 (the constraint means 38 allow relative sliding between the parts and the second end portion 34b is free to move) with respect to the internal shaft 33 which is not subject to significant dimensional variations due to the material used. The overall length of the threaded element 31 in any case increases very little since it is defined by the distance between the end portions 33b and 33a of the internal shaft 33 which has an extremely limited dilatation coefficient. In this way, the thermal stress produces a limited overall elongation of the threaded rectilinear element 31 which depends only on the reduced elongation of the first material.

Therefore, the autoclave heating of the device 2 does not entail a shifting of the sectors 12 with respect to the position defined prior to the heating. The required dimensional tolerances of the tubular fuselage element of the airplane are thus guaranteed.

Furthermore, the nut screw couples with threads made of wear-resistant metallic material, thus providing a robust actuating system able to withstand a plurality of sector opening/closing cycles.

The invention claimed is:

1. An actuating device for producing an airplane fuselage, comprising:
a lamination mandrel that includes a plurality of sectors, each of the sectors including a screw-nut screw actuating system, the actuating system comprising a threaded rectilinear element extending along a radial rotational axis, a nut screw and motor,
wherein said threaded rectilinear element comprises an internal shaft that is made of a first material and that extends along said radial rotational axis and an external tubular portion made of a second material that includes a first end portion and is axially mounted on a respective end portion of said internal shaft that is externally provided with threading, said first material having a dilatation coefficient that is smaller than the dilatation coefficient of the second material,
wherein constraint means are provided between said internal shaft and said external tubular portion that are adaptable to prevent angular displacement of the external tubular portion with respect to the internal shaft and allow a linear sliding of the external tubular portion with respect to the internal shaft so that when a thermal stress applied to said threaded element producing a sliding of a second free end portion of the external tubular portion with respect to the internal shaft, the thermal stress produces a limited overall elongation of the threaded rectilinear element, which depends only on a reduced elongation of the first material and each of the sectors remains in an expanded lamination position following said thermal stress.

2. The system according to claim 1, wherein said constraint means comprise a plurality of longitudinal ribs arranged on the external surface of a portion of said internal shaft that are adapted to couple with longitudinal grooves located on the internal surface of a respective portion of said external tubular portion.

3. The system according to claim 1, wherein said first material is INVAR 36, which is a metal alloy consisting of 64% iron, 36% nickel and trace amounts of carbon and chromium, and the second material is steel.

4. The system according to claim 1, wherein said nut screw and said motor means are held by an internal support structure of said mandrel and said threaded rectilinear element has an end portion coupled with a respective sector.

5. The system according to claim 1, wherein each sector comprises a curved wall which has a cross-section with the profile of an arc of a circle and a stiffening structure facing inwardly of the mandrel and adapted to prevent deflections and deformations of the wall.

* * * * *